(12) United States Patent
Hayakawa

(10) Patent No.: US 10,016,800 B2
(45) Date of Patent: Jul. 10, 2018

(54) ALUMINUM BAR AND METHOD FOR PRODUCING SAME

(71) Applicant: SHOWA DENKO K.K., Tokyo (JP)

(72) Inventor: Tomoya Hayakawa, Fukushima (JP)

(73) Assignee: SHOWA DENKO K.K., Tokyo (JP)

( * ) Notice: Subject to any disclaimer, the term of this patent is extended or adjusted under 35 U.S.C. 154(b) by 265 days.

(21) Appl. No.: 15/074,322

(22) Filed: Mar. 18, 2016

(65) Prior Publication Data

US 2016/0271665 A1 Sep. 22, 2016

(30) Foreign Application Priority Data

Mar. 20, 2015 (JP) .................................. 2015-57915

(51) Int. Cl.
*B21B 45/00* (2006.01)
*B21B 45/02* (2006.01)
(Continued)

(52) U.S. Cl.
CPC ............ *B21B 45/0239* (2013.01); *B08B 3/00* (2013.01); *B21B 3/00* (2013.01); *B21B 45/0269* (2013.01);
(Continued)

(58) Field of Classification Search
CPC ............ B21B 45/0239; B21B 45/0242; B21B 45/0245; B21B 45/0248; B21B 45/0251; B21B 2045/0254; B21B 45/0257; B21B 2045/026; B21B 45/0266; B21B 45/0272; B21B 45/0275; B21B 45/0278; B23D 79/12; B21D 3/02; B21D 3/04; B21D 3/045; B21D 3/05; B21D 3/06; B21D 3/08; B23Q 11/1061; B23Q 11/1038; B23Q 11/10
See application file for complete search history.

(56) References Cited

U.S. PATENT DOCUMENTS 3,676,348 A * 7/1972 Unick .................. C10M 129/08
508/583
5,308,709 A * 5/1994 Ogino ..................... B05D 7/51
148/251
(Continued)

FOREIGN PATENT DOCUMENTS

DE 976189 C * 4/1963 ........... B22D 11/049
JP 09076004 A * 3/1997
JP 2004314176 A 11/2004

OTHER PUBLICATIONS

English Abstract for JP2004314176, Publication Date: Nov. 11, 2004.

*Primary Examiner* — Jacob Cigna
(74) *Attorney, Agent, or Firm* — Millen, White, Zelano & Branigan, P.C.; William Nixon

(57) ABSTRACT

A method for producing an aluminum bar includes at least one machining step in which an aluminum bar-shaped work is machined while supplying a machining fluid containing oil to produce a machined aluminum bar-work, and a cleaning step in which the machined aluminum bar-shaped work is cleaned using a cleaning fluid to produce a cleaned machined aluminum bar-shaped work. The cleaning step is performed so that the oil contained in the machining fluid remains on a surface of the cleaned machined aluminum bar-shaped work in a range of 5 μg/cm² to 20 μg/cm².

12 Claims, 2 Drawing Sheets

(51) Int. Cl.
*B21C 43/00* (2006.01)
*B21B 3/00* (2006.01)
*B08B 3/00* (2006.01)
*B23B 5/12* (2006.01)
*B21D 3/02* (2006.01)

(52) U.S. Cl.
CPC ............... *B21C 43/00* (2013.01); *B23B 5/12* (2013.01); *B21B 2003/001* (2013.01); *B21D 3/02* (2013.01); *B23B 2250/12* (2013.01)

(56) References Cited

U.S. PATENT DOCUMENTS

| | | | |
|---|---|---|---|
| 9,180,512 B2 * | 11/2015 | Sugita | B22D 11/003 |
| 2011/0300397 A1 * | 12/2011 | Sugita | B22D 11/003 |
| | | | 428/577 |
| 2012/0043049 A1 * | 2/2012 | Klinkenberg | B22D 11/04 |
| | | | 164/471 |

* cited by examiner

ALUMINUM BAR AND METHOD FOR PRODUCING SAME

CROSS-REFERENCE TO THE RELATED APPLICATIONS

The present application claims priority to Japanese Patent Application No. 2015-57915 filed on Mar. 20, 2015, the entire disclosure of which is incorporated herein by reference in its entirety.

BACKGROUND OF THE INVENTION

Technical Field

This disclosure relates to an aluminum bar produced by cleaning an aluminum bar-shaped work machined while supplying a machining fluid and a method for producing the aluminum bar.

In this specification and claims, the term "aluminum (Al)" is used to include the meaning of aluminum (Al) and its alloys.

Description of the Related Art

The following description of related art sets forth the inventor's knowledge of related art and certain problems therein and should not be construed as an admission of knowledge in the prior art.

An aluminum bar having a round bar-shape used as a forging blank, etc., is constituted by, for example, a continuously cast bar. Such a continuously cast bar is produced by a continual production line, etc., for producing a continuously cast bar as shown in Japanese Unexamined Laid-open Patent Application Publication No. 2004-314176 (hereinafter referred to as "Patent Document 1"). The continual production line shown in Patent Document 1 includes a melting step for producing a molten aluminum alloy by melting a raw material for aluminum alloy, a molten alloy processing step for removing an aluminum oxide and a hydrogen gas in the molten aluminum alloy produced in the melting step, a continuous casting step for producing an aluminum alloy continuously cast bar (bar-shaped work) by casting the molten aluminum alloy after the molten alloy processing step, an outer periphery removal step (peeling step) for removing the outer peripheral portion of the bar-shaped work, a nondestructive inspection step for inspecting the surface and inside of the bar-shaped work from which the outer peripheral portion was removed, a selection step for determining and selecting quality items based on the result of the nondestructive inspection, and a packaging step for packaging a bar-shaped work (aluminum bar) selected as quality items.

An aluminum bar produced and packaged in a continual production line as described above is commonly not used immediately, but stored for a predetermined period of time. During the storage, the aluminum bar may sometimes be left for a long time in a harsh environment, for example, for more than one week at a temperature of 30° C. and humidity of 80%. Therefore, during the storage, there was a risk that an appearance of soiling and/or an occurrence of corrosion, such as, e.g., oxidation, on the surface of the aluminum bar may cause, resulting in deterioration of the quality.

The description herein of advantages and disadvantages of various features, embodiments, methods, and apparatus disclosed in other publications is in no way intended to limit the present disclosure. For example, certain features of the preferred described embodiments of the disclosure may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

Some embodiments in this disclosure have been developed in view of the above-mentioned and/or other problems in the related art. The embodiments in this disclosure can significantly improve upon existing methods and/or apparatuses.

Some embodiments in this disclosure were made in view of the aforementioned problems, and aim to provide a high-quality aluminum bar capable of enduring a harsh environment even when left in a harsh environment so that an occurrence of soiling and/or corrosion can be prevented. Some embodiments also aim to provide a method for producing such an aluminum bar.

The other purposes and advantages of some embodiments of the present disclosure will be made apparent from the following preferred embodiments.

To achieve the aforementioned purpose, this disclosure includes the following configuration.

[1] A method for producing an aluminum bar, the method comprising:

at least one machining step in which an aluminum bar-shaped work is machined while supplying a machining fluid containing oil to produce a machined aluminum bar-shaped work; and a cleaning step in which the machined aluminum bar-shaped work is cleaned using a cleaning fluid to produce a cleaned machined aluminum bar-shaped work so that the oil contained in the machining fluid remains on a surface of the cleaned machined aluminum bar-shaped work in a range of 5 μg/cm$^2$ to 20 μg/cm$^2$.

[2] The method for producing an aluminum bar as recited in the aforementioned Item [1], wherein the aluminum bar-shaped work is an aluminum continuously cast bar.

[3] The method for producing an aluminum bar as recited in the aforementioned Item [1] or [2], wherein the at least one machining step includes a step of peeling a surface of the aluminum bar-shaped work.

[4] The method for producing an aluminum bar as recited in any one of the aforementioned Items [1] to [3], wherein the at least one machining step includes a step of cutting the aluminum bar-shaped work.

[5] The method for producing an aluminum bar as recited in any one of the aforementioned Items [1] to [4], wherein the at least one machining step includes a step of correcting a curvature of the aluminum bar-shaped work.

[6] The method for producing an aluminum bar as recited in any one of the aforementioned Items [1] to [5], wherein the at least one machining step includes any two or more steps selected from a group consisting of (a) a step of peeling a surface of the aluminum bar-shaped work, (b) a step of cutting the aluminum bar-shaped work, and (C) a step of correcting a curvature of the aluminum bar-shaped work.

[7] The method for producing an aluminum bar as recited in any one of the aforementioned Items [1] to [6], wherein the cleaning fluid is water having a pH of 5.5 to 7.5.

[8] The method for producing an aluminum bar as recited in any one of the aforementioned Items [1] to [7], wherein the machining fluid is a water-soluble cutting fluid or a water-insoluble cutting fluid.

[9] An aluminum bar comprising:

a machined aluminum bar-shaped work having a surface; and an oil film covering the surface of the machined aluminum bar-shaped work, wherein the oil film includes oil contained in a machining fluid used to machine the aluminum bar-shaped work in a range of 5 µg/cm² to 20 µg/cm².

[10] A method for producing an aluminum bar, the method comprising:

producing a machined aluminum bar-shaped work by peeling a surface of an aluminum bar-shaped work using a peeling device;

supplying a machining fluid containing oil during the producing of the aluminum bar-shaped work in a location near the peeling device; and cleaning the machined aluminum bar-shaped work to produce the aluminum bar using a cleaning fluid in a cleaning tank so that the oil contained in the machining fluid remains on a surface of the aluminum bar within a range of about 5 µg/cm² to about 20 µg/cm².

[11] The method for producing an aluminum bar as recited in the aforementioned Item [10], wherein the cleaning of the machined aluminum bar-shaped work is performed by providing the cleaning fluid at a temperature of about 15° C. (degrees Celsius) to about 95° C. (degrees Celsius).

[12] The method for producing an aluminum bar as recited in the aforementioned Item [10] or [11], further comprising packaging the aluminum bar with the oil on the surface.

According to the method for producing an aluminum bar as recited in aforementioned Item [1], since oil remains on the surface of the aluminum bar, sufficient corrosion resistance can be maintained even under a harsh environment and a high-quality aluminum bar capable of preventing corrosion can be produced due to the protective function of the oil film. Furthermore, since the remaining amount of the oil on the surface of the aluminum bar is controlled, an occurrence of detrimental soiling caused by the oil can be effectively prevented and an even better high-quality aluminum bar can be obtained.

According to the method for producing an aluminum bar as recited in any one of the aforementioned Items [2] to [6], the aforementioned effects can be even more assuredly obtained.

According to the method for producing an aluminum bar as recited in the aforementioned Items [7] or [8], the adjustment of the remaining amount of oil can be performed accurately.

According to the aluminum bar of the aforementioned Item [9], in the same manner as mentioned above, an occurrence of corrosion and/or soiling can be prevented and high-quality items can be obtained even if left under a harsh environment.

According to the method for producing an aluminum bar as recited in any one of the aforementioned Items [10] to [12], the aforementioned effects can be obtained.

BRIEF DESCRIPTION OF THE DRAWINGS

Some embodiments of the present disclosure are shown byway of example, and not limitation, in the accompanying figures.

EMBODIMENTS FOR CARRYING OUT THE INVENTION

Figure 1:
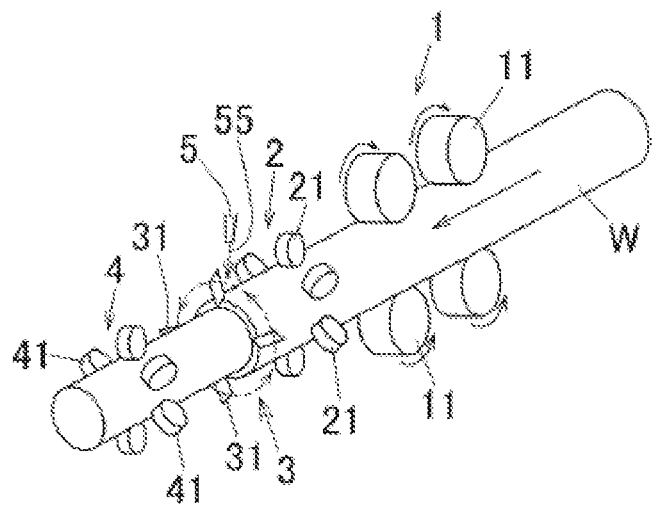
FIG. 1 is a perspective view showing one example of a peeling device for a bar-shaped work according to an embodiment of the present disclosure.

In the following paragraphs, some embodiments in the present disclosure will be described by way of example and not limitation. It should be understood based on this disclosure that various other modifications can be made by those in the art based on these illustrated embodiments.

The method for producing an aluminum bar according to an embodiment of the present disclosure is applied to a continual production line for producing a continuously cast bar. This continual production includes a casting step for producing a round bar-shaped continuously cast bar (bar-shaped work), a heat treatment step for subjecting the casted continuously cast bar to a heat treatment for homogenization, softening, and hardening, a curvature correction step for correcting the curvature of the heat-treated continuously cast bar, a peeling step (surface cutting step) for cutting and removing/peeling the surface of the corrected continuously cast bar, a cleaning step for cleaning the surface of the continuously cast bar from which the surface was cut/peeled, an inspection step for inspecting the cleaned continuously cast bar (aluminum bar), and a packaging step for packaging the aluminum bar determined to have a good quality by inspection.

In this embodiment, a material processed in each of the steps of the continual production line is referred to as a bar-shaped work (work). Among works, a work after completion of the cleaning step is especially referred to as an aluminum bar. Furthermore, in this embodiment, the term "work" is used to include the meaning of an aluminum bar.

The material of the work to be processed in the continual production line in this embodiment is not especially limited as long as it is pure aluminum or aluminum alloy, but the superiority of the present invention can be enhanced especially when 2000 series aluminum alloy, 4000 series aluminum alloy, 7000 series aluminum alloy, or the like, which is poor in corrosive resistance, is used.

Further, an aluminum bar produced in this embodiment is formed into a bar-shape having a diameter adjusted to be 25 mm to 125 mm.

In this embodiment, a cut processing step of cutting the aluminum alloy work produced by casting into a predetermined length can be used. When cutting the work, the cutting method is not especially limited, but saw blade cutting is preferred. That is, by employing saw blade cutting, the cut surface can be adjusted into a desired surface state.

In this embodiment, a roll straightening machine can be preferably used as a device for correcting the curvature of the work W in the curvature correction step. The roll straightening machine is equipped with a pair of straightening rolls, and is configured to correct the curvature of the work W by passing the work W through the pair of straightening rolls in a state in which it is sandwiched from the top and the bottom by the pair of straightening rolls.

In this embodiment, the peeling step constitutes a machining step as defined in this disclosure. Although it will be explained later, in this embodiment, other than a peeling step, a cut processing step, or a curvature correction (straightening) step can constitute the machining step.

The peeling step is for removing the outer peripheral surface for the purpose of removing, for example, an inverse segregation layer on the surface of an aluminum alloy bar-shaped work constituted by the continuously cast bar.

In the peeling step, the surface of the work is cut by about 0.5 mm to 2 mm using a peeling device, a lathe device, a centerless polishing device, etc. In this embodiment, it is preferable that the surface state of the work after the peeling is Ra 10 µm or less.

At the time of cutting the surface, to obtain lubricating effects, welding resistance effects, cooling effects, etc., a cutting fluid as a machining fluid is supplied around the periphery of the cutting process portion of the work.

The method of supplying the machining fluid is not especially limited, and any method can be used as long as the method is capable of supplying the machining fluid to a predetermined position(s) on the outer peripheral surface of the work. Further, the supplying amount of the machining fluid is not especially limited, and can be arbitrarily adjusted according to the type and/or degree of processing.

In this embodiment, the type of the machining fluid is not especially limited, and any type may be used as long as oil is at least included.

In this embodiment, a water-soluble cutting fluid and a water-insoluble cutting fluid can be exemplified as suitable examples of the cutting fluid (machining fluid) to be used at the time of the peeling (surface cutting) step. It is common for these cutting fluids to be used by diluting an undiluted solution. For example, a water-soluble cutting fluid is used by diluting an undiluted solution with water, and in JIS (Japanese Industrial Standards), it is classified into A1, A2, and A3, and each of them is used in all of emulsion, soluble, and solution.

Figure 2:
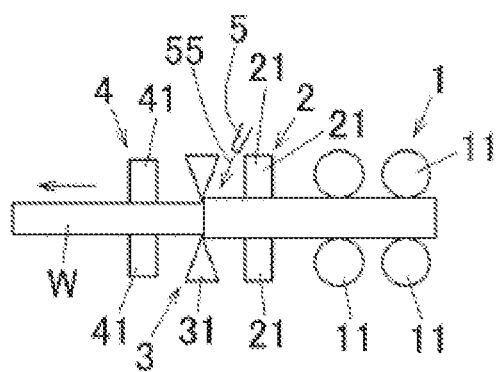
FIG. 2 is a schematic side view showing the peeling device of the embodiment.

FIG. 1 is a perspective view showing one example of a peeling device according to this embodiment capable of being used in the aforementioned peeling step, and FIG. 2 is a side view showing the peeling device.

As shown in both figures, the peeling device is equipped with a roller carrying device 1, an upstream side roller supporting device 2, a cutting machine 3, a downstream side roller supporting device 4, and a cutting fluid supply device 5 for supplying a cutting fluid to cutting process portions of the work W.

In the cutting machine 3, a plurality of cutting blades 31 are provided at even intervals in the circumferential direction along the outer peripheral surface of the work W to be carried along the carrying line. In this embodiment, for the cutting blade 31 at each location, a combination tool having a pair of blades, a rough-machining blade and a finishing blade, is used. In this disclosure, needless to say, the number, etc., of the cutting blade (cutter) is not limited, and a cutting blade other than a combination tool can be used.

Further, in this embodiment, by carrying the work W along the carrying line while rotating the cutting blade 31, the outer peripheral surface of the work W is cut and removed/peeled by the cutting blade 31 without causing incompletely cut parts.

Furthermore, during the cutting step, a cutting fluid 55 is supplied to the vicinity of the cutting process portion on the surface of the work W from the cutting fluid supply device 5.

In the upstream side roller supporting device 2 and the downstream side roller supporting device 4, a plurality of upstream side supporting rollers 21 and a plurality of downstream side supporting rollers 41 are provided at even intervals in the circumferential direction along the outer peripheral surface of the aluminum bar W, so that each of the supporting rollers 21 and 41 are driven on the outer peripheral surface of the work W in association with the carrying of the work W. In this disclosure, the number of rollers arranged in the upstream side roller supporting device 2 and the downstream side roller supporting device 4 is not especially limited. For example, a roller supporting device in which 4 to 12 rollers are arranged is suitably used as each roller supporting device.

In this embodiment, the upstream side supporting roller 21 and the downstream side supporting roller 41 are also used as guide rollers, which support the work W while guiding the work W.

The roller carrying device 1 is equipped with a total of four carrying rollers (feed rollers) arranged two by two up and down, and back and forth with respect to the carrying line. Each of the carrying rollers 11 sandwiches the work W with the corresponding upper or lower carrying roller 11 to grip (hold) the work W. In this gripped state, the carrying rollers 11 are rotated by an unillustrated roller driving mechanism so that the work W is carried to the downstream side along the carrying line.

In the peeling device having the abovementioned structure, the work W carried out from the roller carrying device 1 is carried so as to pass the upstream side roller supporting device 2, the cutting machine 3, and the downstream side roller supporting device 4. When the work W carried in such a manner passes the cutting machine 3, the cutting blades 31 rotate in the circumferential direction along the outer peripheral surface of the work W while the cutting fluid 55 is supplied from the cutting fluid supply device 5, so that the outer peripheral surface of the work W is cut and removed.

In this embodiment, as described above, a curvature correction step (first curvature correction step) is performed before the peeling step, but a second curvature correction step for correcting the curvature of the work W can be performed after the peeling step. Also in this second curvature correction step, the curvature can be corrected by using a roll straightening device similar to the roll straightening device that can be used in the curvature correction step (first curvature correction) before the peeling step.

In this embodiment, the work W after the peeling step is cleaned in the cleaning step.

As a cleaning fluid, any non-soluble or non-chlorine type cleaning fluid can be used, and it is preferable to use a fluid low in oil cleaning capability. For example, it is common to use, for example, cold water, room temperature water (water), high temperature water (hot water), etc. Low temperature, room temperature, or high temperature pure or industrial water can be suitably used, and it is especially preferable to use industrial water. That is, industrial water is not sterilized, which can suppress negative effects to the work W (aluminum bar), such as, e.g., promotion of corrosion.

Further, in this embodiment, in the cleaning fluid, the hydrogen ion exponent (pH) is important, and the pH should be adjusted as needed. Specifically, it is preferable to use a cleaning fluid having a pH of 5.5 to 7.5. That is, when the pH deviates from this range, corrosion is more likely to occur, preventing sufficient cleaning of the work W, which makes it difficult to adjust the remaining amount of oil to be described later, and therefore it is not preferable. In other words, when a cleaning fluid having a pH adjusted to fall within the aforementioned specific range is used, corrosion is less likely to occur, enabling effective cleaning, which makes it possible to accurately control the remaining amount of the oil.

Further, the temperature of the cleaning fluid is not especially limited, but it is preferably adjusted to about 15° C. (degrees Celsius) to about 95° C. (degrees Celsius). That is, when adjusted to fall within this temperature range, the oil can be moderately removed to easily control the remaining amount of the oil after the cleaning step.

Although not especially limited, for the cleaning method, it is suitable to use, for example, a method in which a cleaning fluid is directly poured onto the work W, a method in which the work W is immersed in a cleaning tank filled with the cleaning fluid, or a method in which the work is passed in a cleaning tank. Further, at the cleaning step, ultrasonic waves can be applied to increase the cleaning effect. Furthermore, when using any of the aforementioned methods, a method in which the work surface is wiped using a wiping tool in which a cloth or a soft porous material (sponge, etc.) is soaked in a cleaning fluid can be added.

Further, when cleaning a short length work W, for example, a multiple tank type continuous carrying cleaning device equipped with two or more cleaning tanks in which the work W is sequentially immersed can be suitably used. When using such a multiple tank type continuous carrying cleaning device, by using a multiple tank type continuous carrying cleaning device in which a cleaning fluid in the tank for final immersion (final tank) is hot water with a temperature of about 70° C. (degrees Celsius) to about 95° C. (degrees Celsius), the work (aluminum bar) W after cleaning can be dried in a short time, which can improve the productive efficiency.

Figure 3:
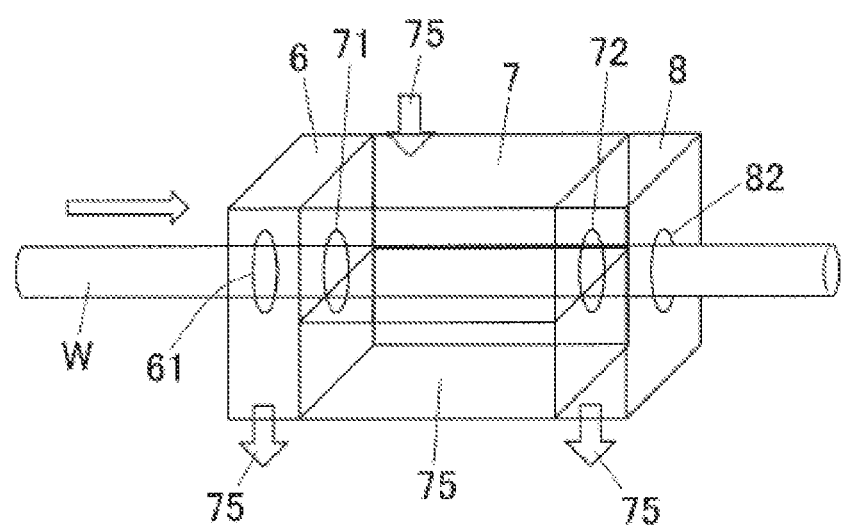
FIG. 3 is a schematic perspective view showing one example of a cleaning device according to the embodiment.

Further, when cleaning a long length work W, for example, a cleaning device as shown in FIG. 3 is used. The cleaning device is equipped with a front drain chamber 6, a cleaning tank 7, and a rear drain chamber 8 aligned in the front and rear direction (work carrying direction). A circular carry-in opening 61 is formed in the front wall of the front drain chamber 6, and the outside and the front drain chamber 6 are communicated via the carry-in opening 61. A circular ejection opening 82 is formed in the rear wall of the rear drain chamber 8, and the outside and the rear drain chamber 8 are communicated via the ejection opening 82.

A circular cleaning tank entrance opening 71 is formed in the dividing wall between the front drain chamber 6 and the cleaning tank 7 corresponding to the carry-in opening 61, and the front drain chamber 6 and the cleaning tank 7 are communicated via the cleaning tank entrance opening 71. A circular cleaning tank exit opening 72 is formed in the dividing wall between the cleaning tank 7 and the rear drain chamber 8 corresponding to the ejection opening 82, and the cleaning tank 7 and the rear drain chamber 8 are communicated via the cleaning tank exit opening 72.

The axial centers of the carry-in opening 61, the cleaning tank entrance opening 71, the cleaning tank exit opening 72, and the ejection opening 82 are arranged on the carrying line, and the work W carried in from the carry-in opening 61 sequentially passes through the cleaning tank entrance opening 71, the cleaning tank exit opening 72, and the ejection opening 82, thereby passing through the front drain chamber 6, the cleaning tank 7, and the rear drain chamber 8 to be carried out in the rear direction.

A cleaning fluid 75 is supplied to the cleaning tank 7 at all times, and in a state in which the work W is not subjected to the cleaning step, the cleaning fluid 75 supplied inside the cleaning tank 7 overflows from the cleaning tank entrance opening 71 and the cleaning tank exit opening 72 and flows out to the front drain chamber 6 and the rear drain chamber 8. Furthermore, a drain opening (not illustrated) is formed in each of the drain chambers 6 and 8, and the cleaning fluid 75 that flows into the drain chambers 6 and 8 is drained outside via each drain opening. Therefore, in a state in which the work W is not being subjected to the cleaning step, the water level of the cleaning fluid 75 in the cleaning tank 7 is maintained near the bottom end portion of the cleaning tank entrance opening 71 and the cleaning tank exit opening 72 as shown in FIG. 3.

Further, a watertight member, such as, e.g., a rubber packing, is mounted on the outer peripheral edge of each of the cleaning tank entrance opening 71 and the cleaning tank exit opening 72. When the work W passes through the cleaning tank entrance opening 71 and the cleaning tank exit opening 72, the gap between the outer peripheral surface of the work W and the inner peripheral surface of each of the cleaning tank entrance opening 71 and the cleaning tank exit opening 72 becomes very narrow, increasing the watertightness between them. Therefore, the cleaning fluid 75 drained through the cleaning tank entrance opening 71 and the cleaning tank exit opening 72 from the cleaning tank 7 decreases, raising the water level in the cleaning tank 7. With this, the work W is maintained under the liquid level in the cleaning fluid 75, and the work W is carried in that state. Therefore, the work W can pass through the cleaning tank 7 in a state in which it is submerged in the cleaning fluid 75, which enables cleaning of the whole circumference of the work W.

When using such a cleaning device, the production efficiency can be improved since the long length work W can be sequentially cleaned in a continuous process without stopping. For example, the work W can be sequentially cleaned in a continuous process by setting the carrying speed at 10 m/min to 30 m/min.

Further, at the ejection opening of the cleaning device, an air blow equipment, etc., for removing excessive moisture (cleaning fluid) can be arranged.

Further, in this embodiment, the cleaning step can be used as an internal quality inspection of an inspection step. That is, in an ultrasonic flaw detection inspection of an internal quality inspection, a work W is immersed in water (cleaning fluid) in a tank (cleaning tank) and ultrasonic vibration is applied, and this inspection can be used as the cleaning step. In this case, a process for preventing a large amount of machining fluid (cutting fluid) from entering into the tank, for example, an air blow supplying process, can be performed after the peeling step and before the internal quality inspection (cleaning step), which prevents the water inside the water tank to be contaminated with the machining fluid (cutting fluid) and excessively raising the density of the cutting fluid in the water inside the water tank. In other words, by preventing the increase of the cutting fluid density, an occurrence of foams in the water tank can be suppressed at the same time as properly controlling the remaining amount of the oil on the surface of the work W.

In this embodiment, the surface of the work W is cleaned in the cleaning step, and the oil of the cutting fluid 55 supplied to the work W is also made to remain in the oil-supply processing step such as the peeling step, etc. Specifically, in this embodiment, it is necessary to remain 5 µg/cm$^2$ to 20 µg/cm$^2$ of the oil contained in the cutting fluid 55 on the surface of the work (aluminum bar) W after the cleaning step. That is, when the remaining amount of the oil does not reach 5 µg/cm$^2$, the protective function by the oil film is not sufficiently obtained, and when the aluminum bar W is left for a long period of time under a harsh environment after packaging, it is not preferable since it may be difficult to assuredly prevent corrosion, such as, e.g., oxidation, from occurring on the surface. Further, when the remaining amount of the oil exceeds 20 µg/cm$^2$, it is not preferable since the amount of oil is excessive and it may be difficult to assuredly control the occurrence of soiling, such as, e.g., stains, resulting from the oil after drying the oil. Further, it is not preferable when soiling, etc., from the oil has occurred on the surface of the aluminum bar, or when the aluminum bar is discolored or the aluminum bar is used as a forging blank later, since the effect of the lubricant at the time of forging may be reduced.

In the inspection step after the cleaning step, a nondestructive inspection for inspecting the surface and the inside of the aluminum bar W is performed. After that, a plurality of aluminum bars W determined to be good in quality in the inspection step are bound together and packaged in a packaging step. In this embodiment, each of the steps after the cleaning step, specifically the inspection step and the packaging step, is referred to as a post-step.

The packaged aluminum bar W is used as, for example, a forging blank after being unpacked. That is, the aluminum bar W after being unpacked is cut into a predetermined length in a cut processing step, the aluminum bar W after the cutting is preheated in a preheating heat treatment step, and used as a forging blank after supplying a lubricant. Then, the forging blank is introduced into a mold of a forging device in a forging step for molding to obtain a forged material having a predetermined shape.

In this embodiment, since a moderate amount of oil remains on the surface of the aluminum bar W packaged in the packaging step, after the packaging and until the oil is removed by heating, degreasing, etc., for example, until being used as a forging blank, sufficient corrosive resistance can be maintained, an occurrence of corrosion such as oxidation, etc., can be prevented, and excellent quality can be assuredly maintained.

Furthermore, in this embodiment, since the remaining amount of the oil on the surface of the aluminum bar W is properly controlled, an occurrence of harmful soiling, etc., caused by oil can be prevented, thereby further improving the quality of the aluminum bar.

In the aforementioned embodiment, a continuously cast bar is used as the aluminum bar, but in this disclosure, any bar other than a continuously cat bar can be used. For example, in the present invention, any extruded bar produced by extruding a cast billet can be used as a work (aluminum bar).

Further, in the aforementioned embodiment, the work is formed to have a circular cross-section, but in this disclosure, the cross-sectional shape of the aluminum bar is not limited to a circular shape, and can be a polygon, such as, e.g., a quadrangle, a hexagon, etc., or an ellipse, an oval, or an irregular shape.

Furthermore, in the aforementioned embodiment, a case in which the peeling step (surface cutting step) is an oil-supply processing step for processing while supplying a cutting fluid was exemplified, but in this disclosure, the oil-supply processing step is not limited only to a peeling step. For example, a cut processing step, a first curvature correction step and a second curvature correction step can be the oil-supply processing step and the oil remaining amount of the machining fluid supplied in the step can be controlled in the cleaning step.

As the machining fluid to be used in the cut processing step and/or the curvature corrections step, a fluid similar to the cutting fluid used in the peeling step, such as, e.g., a water-soluble cutting fluid or a water-insoluble cutting fluid, can be suitably used.

Further, in this disclosure, the oil-supply processing step can be constituted by a single step, or two or more steps. For example, at least one or more steps selected from a group consisting of the peeling step, the cut processing step, the first curvature correction step, and the second curvature correction step, can be the oil-supply processing step.

Furthermore, in this disclosure, after performing the oil-supply processing step, it is not necessary to immediately perform the cleaning step, and one or a plurality of appropriate steps can be performed between the oil-supply processing step and the cleaning step.

The continual production line of the aforementioned embodiment is configured to execute a casting step, a heat treatment step, a curvature correction step, a peeling step, a cleaning step, post-steps (an inspection step and a packaging step) in that order, but other embodiments (modified embodiments) of a continual production line for producing an aluminum bar are shown in the following Items (1) to (4).

(1) A continuous casting step, a heat treatment step, a first curvature correction step, a peeling step, a second curvature correction step, a cleaning step, and post-steps are performed in that order.

(2) An extrusion step, a heat treatment step, a curvature correction step, a cleaning step, and post-steps are performed in that order.

(3) An extrusion step, a drawing step, a heat treatment step, a curvature correction step, a cleaning step, and post-steps are performed in that order.

(4) A material production step (a step for producing an extruded material, a drawn material, or a cast peeled material), a cutting step, a cleaning step, and post-steps are performed in that order.

EXAMPLES

TABLE 1

| | Cutting Fluid Density [mass %] | Cleaning Method | Oil Remaining Amount [μg/cm$^2$] | Surface Soiling | Corrosion Occurrence Area (Corroded Portion Area) | Comprehensive Evaluation |
|---|---|---|---|---|---|---|
| Ex. 1 | 1% | 20° C. water | 15 | Nil | 0.9% | ◎ |
| Ex. 2 | 7% | 20° C. water | 19 | Nil | 0.5% | ◎ |
| Ex. 3 | 1% | 95° C. water | 7 | Nil | 1.2% | ◎ |
| Ex. 4 | 1% | Immersed in 20° C. water tank | 15 | Nil | 1.1% | ◎ |
| Comp. Ex. 1 | 7% | Degreased with solution | 2 | Nil | 24.8% | X |
| Comp. Ex. 2 | 7% | Nil | 25 | Yes | 0.2% | Δ |

Example 1

After subjecting a round bar-shaped continuously cast bar (work) produced by continuously casting 4000 series aluminum alloy to a homogenization treatment, the surface was cut by 3 mm in diameter using a peeling device as shown in FIG. 1 and FIG. 2 to produce an aluminum alloy bar-shaped work having a diameter of 25 mm. As shown in the cutting fluid density item in Table 1, in Example 1, as the cutting fluid (machining fluid) supplied at the time of the peeling step, a cutting fluid in which an undiluted solution of a water-soluble cutting fluid was diluted with water so as to have an oil density (density of the undiluted solution) of 1 mass % was used.

Next, the work after the peeling step was cleaned using a cleaning device as shown in FIG. 3. At this time, 20° C. industrial water (pH 6.3) was used as the cleaning fluid. In this cleaning step, the work was carried at a carrying speed of 20 m/min. Since the length (width) of the cleaning tank 7 of the cleaning device was 500 mm, the time needed for the portion of the work to be subjected to a cleaning step to pass through the cleaning fluid was 1.5 seconds.

After cleaning, the work (aluminum bar) was air-blown to be naturally dried, and then the work was cut into a 100 mm length with no lubricant to produce a sample (aluminum bar) of Example 1.

Next, the amount of oil of the cutting fluid remaining on the outer peripheral surface of the sample of Example 1, was measured in the following manner. The evaluation subject area (outer peripheral surface area) was set to be 50 cm$^2$ or more, and the evaluation subject area of the sample of Example 1 was about 88 cm$^2$.

When measuring the amount of oil, after the sample of Example 1 was ultrasonically washed for one minute in n-hexane extract at room temperature, the extract was heated and condensed, then the extract was transferred to a weighing bottle and dried, and the weight (mass) of the dried solid material was measured at room temperature. The mass of the oil measured in such a manner was divided by the evaluation subject area to calculate the mass of the oil (oil remaining amount) per unit area. The result was 15 μg/cm$^2$ as shown in Table 1.

Example 2

As shown in Table 1, except that a cutting fluid having 7 mass % oil density was used at the time of the peeling step, the sample of Example 2 was produced in the same manner as the aforementioned Example 1.

Further, the oil remaining amount of the sample of Example 2 measured in the same manner as in Example 1 was 19 μg/cm$^2$.

Example 3

As shown in Table 1, a cleaning method in which 95° C. industrial water was used as a cleaning fluid in the cleaning step was used for a work subjected to the peeling step in the same manner as in Example 1, and the work was further subjected to a curvature correction step using a roll straightening device after the cleaning step. Except for the above, the sample of Example 3 was produced in the same manner as in Example 1. Further, in a curvature correction step using a roll straightening device, the same cutting fluid as the cutting fluid used at the time of the peeling step in Example 3 was supplied to the work.

Further, the oil remaining amount of the sample of Example 3 measured in the same manner as Example 1 was 7 μg/cm$^2$.

Example 4

As shown in Table 1, except that a cleaning method in which the work was immersed for one minute in a water tank filled with 20° C. industrial water in the cleaning step was used, the sample of Example 4 was produced in the same manner as in Example 1.

Further, the oil remaining amount of the sample of Example 4 measured in the same manner as in Example 3 was 15 μg/cm$^2$.

Comparative Example 1

As shown in Table 1, except that a cleaning method in which the work was immersed for one minute in a solution tank filled with a solution in the cleaning step was used, the sample of Comparative Example 1 was obtained in the same manner as in Example 2.

Further, the oil remaining amount of the sample of Comparative Example 1 measured in the same manner as in Example 1 was 2 μg/cm$^2$.

Comparative Example 2

As shown in Table 1, except that a cleaning step was not performed, the sample of Comparative Example 2 was obtained in the same manner as in Example 2.

Further, the oil remaining amount of the sample of Comparative Example 1 measured in the same manner as in Example 1 was 25 μg/cm$^2$.

<Evaluation of Surface Soiling>

Each of the samples of Examples 1 to 4 and Comparative Examples 1 and 2 were visually inspected to determine the presence or absence of spot shapes or linear stains, etc., caused by drying of the cutting fluid. The samples with soiling were evaluated as "Yes" and the samples with no soiling were evaluated as "Nil." The evaluation results are shown together in Table 1.

<Evaluation of Corrosion>

The surfaces of each of the samples of Examples 1 to 4 and Comparative Examples 1 and 2 were left for 7 days under the environment of 30° C. temperature and 90% density. After that, the surface of each of the samples was inspected with a visual sensor to measure the area of the corrosion product (corrosion occurrence area ratio=corroded area/total area). The results are shown together in Table 1.

<Comprehensive Evaluation>

When the corrosion occurrence area was less than 3% of the total surface area and the surface soiling was "Nil", the comprehensive evaluation is shown as "⊙", and when the corrosion occurrence area was 3% or more and less than 5% of the total surface area and the surface soiling was "Nil", the comprehensive evaluation is shown as "◯". Furthermore, when the corrosion occurrence area was 5% or more and less than 10% of the total surface area and the surface soiling was "Nil", and when the corrosion occurrence area was less than 10% of the total surface area but the surface soiling was "Yes", the comprehensive evaluation is shown as "Δ". Further, when a lot corrosion had occurred, that is, when the corrosion occurrence area was 10% or more of the total surface area, the comprehensive evaluation is shown as "X". The results are shown together in Table 1.

<Examination Results Based on Examples, Etc.>

When comparing Example 1 and Comparative Example 1, it can be understood that corrosion occurred when the oil remaining amount was too little.

When comparing Example 1 and Comparative Example 2, it can be understood that soiling occurred when the oil remaining amount was excessive. Further, in cases where soiling occurs, the aluminum bar is discolored afterwards, or the effect of the lubricant at the time of the forging step may be reduced when the aluminum bar is used as a forging blank, and therefore it is not preferable.

When comparing Example 1 and Example 2, it can be understood that the oil remaining amount after the cleaning step can be increased and the oil remaining amount can be easily adjusted when the oil density of the cutting fluid is higher.

When comparing Example 1 and Example 4, for the cleaning method in which the work was passed through the cleaning fluid or for the cleaning method in which the work was immersed in the cleaning fluid, that is, regardless of the cleaning method, it can be understood that when an appropriate amount of oil remains after the cleaning, soiling and corrosion can be prevented.

By referring Examples 1 to 4 and Comparative Examples 1 and 2, it can be understood that, when the oil remaining amount after the cleaning step is in the range of 5 µg/cm$^2$ to 20 µg/cm$^2$, a high quality aluminum bar in which soiling and corrosion does not occur can be produced.

The production method of the aluminum bar of the present invention can be used when producing an aluminum bar such as a forging material.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. A method for producing an aluminum bar, the method comprising:
    at least one machining step in which an aluminum bar-shaped work is machined while supplying a machining fluid containing oil to produce a machined aluminum bar-shaped work; and
    a cleaning step in which the machined aluminum bar-shaped work is cleaned using a cleaning fluid to produce a cleaned machined aluminum bar-shaped work so that the oil contained in the machining fluid remains on a surface of the cleaned machined aluminum bar-shaped work in a range of 5 µg/cm$^2$ to 20 µg/cm$^2$.

2. The method for producing an aluminum bar as recited in claim 1, wherein the aluminum bar-shaped work is an aluminum continuously cast bar.

3. The method for producing an aluminum bar as recited in claim 1, wherein the at least one machining step includes a step of peeling a surface of the aluminum bar-shaped work.

4. The method for producing an aluminum bar as recited in claim 1, wherein the at least one machining step includes a step of cutting the aluminum bar-shaped work.

5. The method for producing an aluminum bar as recited in claim 1, wherein the at least one machining step includes a step of correcting a curvature of the aluminum bar-shaped work.

6. The method for producing an aluminum bar as recited in claim 1,
    wherein the at least one machining step includes any two or more steps selected from a group consisting of
    (a) a step of peeling a surface of the aluminum bar-shaped work,
    (b) a step of cutting the aluminum bar-shaped work, and
    (C) a step of correcting a curvature of the aluminum bar-shaped work.

7. The method for producing an aluminum bar as recited in claim 1, wherein the cleaning fluid is water having a pH of 5.5 to 7.5.

8. The method for producing an aluminum bar as recited in claim 1, wherein the machining fluid is a water-soluble cutting fluid or a water-insoluble cutting fluid.

9. A method for producing an aluminum bar, the method comprising:
    producing a machined aluminum bar-shaped work by peeling a surface of an aluminum bar-shaped work using a peeling device;
    supplying a machining fluid containing oil during the producing of the machined aluminum bar-shaped work in a location near the peeling device; and
    cleaning the machined aluminum bar-shaped work to produce the aluminum bar using a cleaning fluid in a cleaning tank so that the oil contained in the machining fluid remains on a surface of the aluminum bar within a range of about 5 µg/cm$^2$ to about 20 µg/cm$^2$.

10. The method for producing an aluminum bar as recited in claim 9, further comprising packaging the aluminum bar with the oil on the surface.

11. The method for producing an aluminum bar as recited in claim 9, wherein the cleaning of the machined aluminum bar-shaped work is performed by providing the cleaning fluid at a temperature of about 15° C. (degrees Celsius) to about 95° C. (degrees Celsius).

12. The method for producing an aluminum bar as recited in claim 11, wherein the cleaning of the machined aluminum bar-shaped work is performed by providing the cleaning fluid at a temperature of about 70° C. (degrees Celsius) to about 95° C. (degrees Celsius).

\* \* \* \* \*